US011002890B1

(12) United States Patent
Richards et al.

(10) Patent No.: US 11,002,890 B1
(45) Date of Patent: May 11, 2021

(54) OPTICAL LAYERS FOR FRESNEL SURFACES

(71) Applicant: Facebook Technologies, LLC, Menlo Park, CA (US)

(72) Inventors: Evan M. Richards, Fremont, CA (US); Kurt Allen Jenkins, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 297 days.

(21) Appl. No.: 15/824,886

(22) Filed: Nov. 28, 2017

(51) Int. Cl.
*G02B 3/08* (2006.01)
*B29D 11/00* (2006.01)
*B29C 33/30* (2006.01)
*G02B 5/09* (2006.01)
*B29C 33/42* (2006.01)

(52) U.S. Cl.
CPC .............. *G02B 3/08* (2013.01); *B29C 33/302* (2013.01); *B29C 33/42* (2013.01); *B29D 11/00269* (2013.01); *B29D 11/00865* (2013.01); *G02B 5/09* (2013.01)

(58) Field of Classification Search
CPC .......... G02B 3/08; G02B 5/09; G02B 5/1876; G02B 27/01; G02B 27/0101; G02B 27/0149; G02B 27/017; G02B 27/0172; G02B 27/0176; G02B 27/0179; B29C 33/42; B29C 33/302; B29D 11/00269; B29D 11/0086; G11B 2007/13722; G02C 2202/20; G02C 7/02–088; G02F 1/133526; A63F 2009/0633; B29L 2011/005; B60J 1/18; F21V 5/045; F24S 23/31; F21S 11/002; Y02E 10/43
USPC .... 359/457, 742, 741–743, 13–14, 629–633; 351/159.72
See application file for complete search history.

(56) References Cited

U.S. PATENT DOCUMENTS

| 4,714,823 | A  | * | 12/1987 | Spruck | G02B 21/06 250/205 |
| 6,947,225 | B2 | * | 9/2005 | Sekiguchi | G02B 3/08 359/460 |
| 2004/0085648 | A1 | * | 5/2004 | Tomono | G02B 27/0172 359/631 |
| 2005/0195489 | A1 | * | 9/2005 | Watabe | G02B 3/08 359/642 |
| 2006/0109569 | A1 | * | 5/2006 | Ogawa | G02B 3/08 359/742 |
| 2007/0285773 | A1 | * | 12/2007 | Ogawa | G02B 3/08 359/457 |
| 2007/0297073 | A1 | * | 12/2007 | Braithwaite | G02B 3/08 359/742 |
| 2012/0212819 | A1 | * | 8/2012 | Takano | G02B 5/1895 359/558 |
| 2013/0050851 | A1 | * | 2/2013 | Machida | G02B 3/08 359/742 |

\* cited by examiner

*Primary Examiner* — Marin Pichler
*Assistant Examiner* — Alberto J Betancourt
(74) *Attorney, Agent, or Firm* — Freestone Intellectual Property Law PLLC; Aaron J. Visbeek

(57) ABSTRACT

An optical element includes a Fresnel surface including valleys between Fresnel segments. Compensation trenches disposed in the valleys are configured to accept excess of an optical layer received in the valleys during a deposition of the optical layer. The compensation trenches are filled with the optical layer.

14 Claims, 7 Drawing Sheets

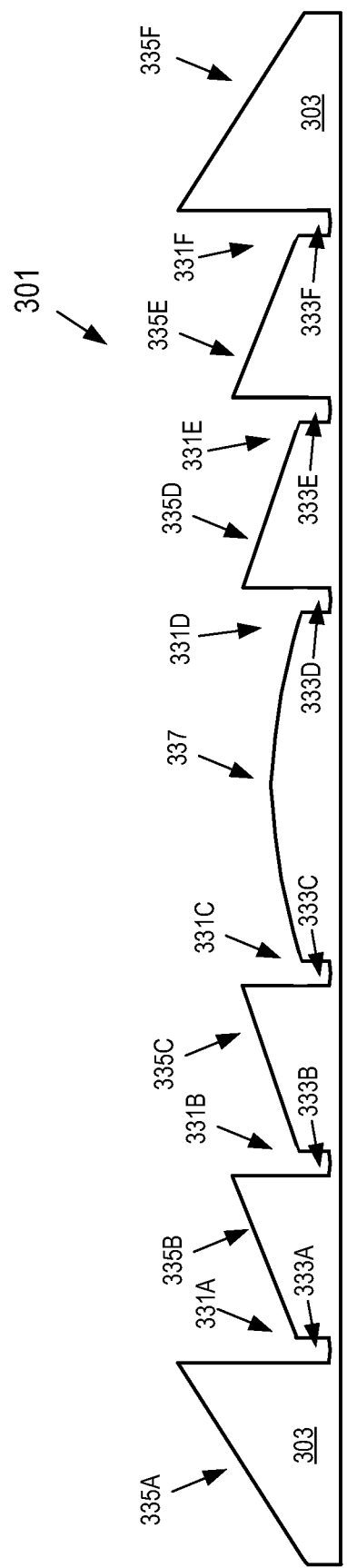
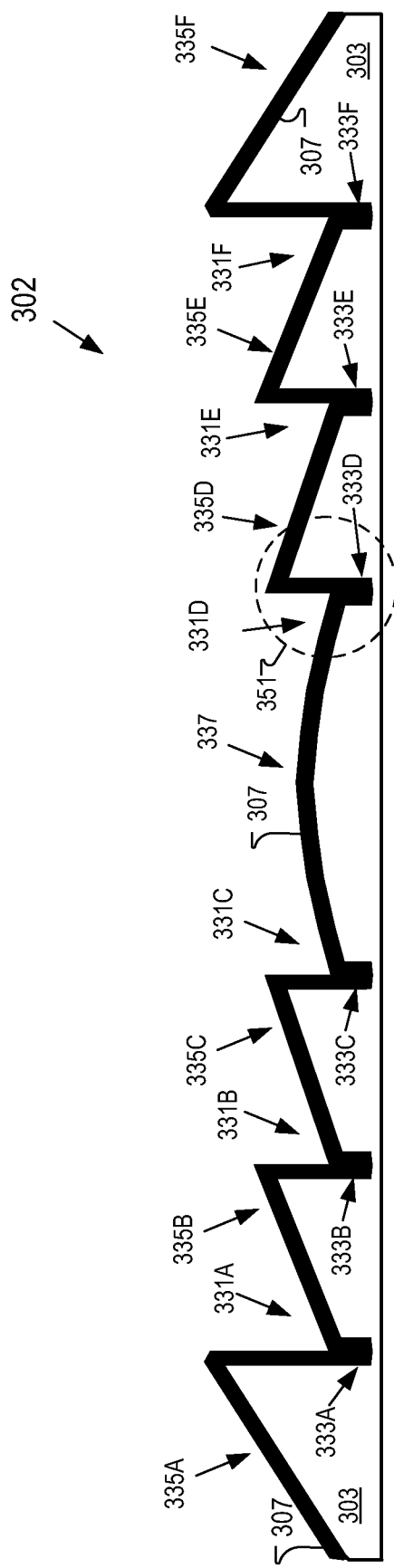
FIG. 3A
FIG. 3B

OPTICAL LAYERS FOR FRESNEL SURFACES

TECHNICAL FIELD

This disclosure relates generally to optics, and in particular to but not exclusively to optical layers deposited onto Fresnel surfaces.

BACKGROUND INFORMATION

Lenses and other optical elements are ubiquitous in both consumer and commercial products such as cameras, displays, and sensors. Fresnel lenses were famously developed in the early 1800s and originally deployed in lighthouses to increase the distance that the light from the lighthouse could be viewed by ships. Using Fresnel lenses can be advantageous in that they are thinner (and often lighter) than conventional lenses with similar optical power. Yet, many design tradeoffs are involved in the engineering and fabrication of Fresnel lenses.

SUMMARY

Embodiments of the disclosure include a Fresnel lens including a refractive material, a Fresnel surface formed in the refractive material, an optical layer, and compensation trenches. The Fresnel surface is formed in the refractive material and the Fresnel surface includes valleys between Fresnel segments of the Fresnel surface. The optical layer is disposed on the Fresnel surface. The compensation trenches are filled with the optical layer and the compensation trenches are disposed in the valleys between the Fresnel segments. The compensation trenches are configured to accept excess of the optical layer received in the valleys during a deposition of the optical layer of the Fresnel surface. The optical layer may include an anti-reflective layer having a second index of refraction that is less than a first index of refraction of the refractive material. In one embodiment, the optical layer includes a color filter having multiple sub-layers.

In one embodiment, a head mounted display includes a display for providing image light and a lens assembly configured to receive the image light from the display and generate a virtual image (by collimating the image light) for viewing by an eye of a wearer of the HMD. The lens assembly includes a Fresnel lens comprising a refractive material, a Fresnel surface formed in the refractive material, an optical layer, and compensation trenches. The refractive material has a first index of a refraction and the optical layer has a second index of refraction different from the first index of refraction. The Fresnel surface includes valleys between Fresnel segments of the Fresnel surface. The optical layer is disposed on the Fresnel surface. The compensation trenches are filled with the optical layer and the compensation trenches are disposed in the valleys between the Fresnel segments. The compensation trenches are configured to accept excess of the optical layer received in the valleys during a deposition of the optical layer of the Fresnel surface.

In one embodiment, fabricating an optical element includes forming a Fresnel surface including valleys between Fresnel segments of the Fresnel surface and forming compensation trenches disposed in the valleys of the Fresnel segments. An optical layer is deposited on the Fresnel surface and depositing the optical layer on the Fresnel surface includes filling the compensation trenches with the optical layer. The optical element may be a refractive Fresnel lens or a Fresnel reflector.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 3A illustrates a cross-section view of an example Fresnel lens including compensation trenches disposed in valleys of the Fresnel lens, in accordance with an embodiment of the disclosure.

FIG. 3B illustrates a cross-section view of an example Fresnel lens having an optical layer disposed in the compensation trenches and on a Fresnel surface of the Fresnel lens, in accordance with an embodiment of the disclosure.

DETAILED DESCRIPTION

Embodiments of optical layers on Fresnel surfaces are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

Optical elements, methods of fabricating optical elements, and systems incorporating optical element(s) that are described in this disclosure include Fresnel lenses and Fresnel reflectors having optical layers disposed on a Fresnel surface. The optical layers may be anti-reflective coatings, color filters, or otherwise. Conventional deposition techniques result in excess of the optical layer accumulating in valleys of the Fresnel surface which changes the intended refractive or reflective boundaries of a lens or reflector. Embodiments of the disclosure may assist in more precision fabrication of optical elements having optical layers and Fresnel surfaces. In one embodiment, a Fresnel surface includes compensation trenches to compensate for excess material that forms in valleys of the Fresnel surface during conventional deposition techniques. These and other embodiments are described in detail below.

Figure 1A:
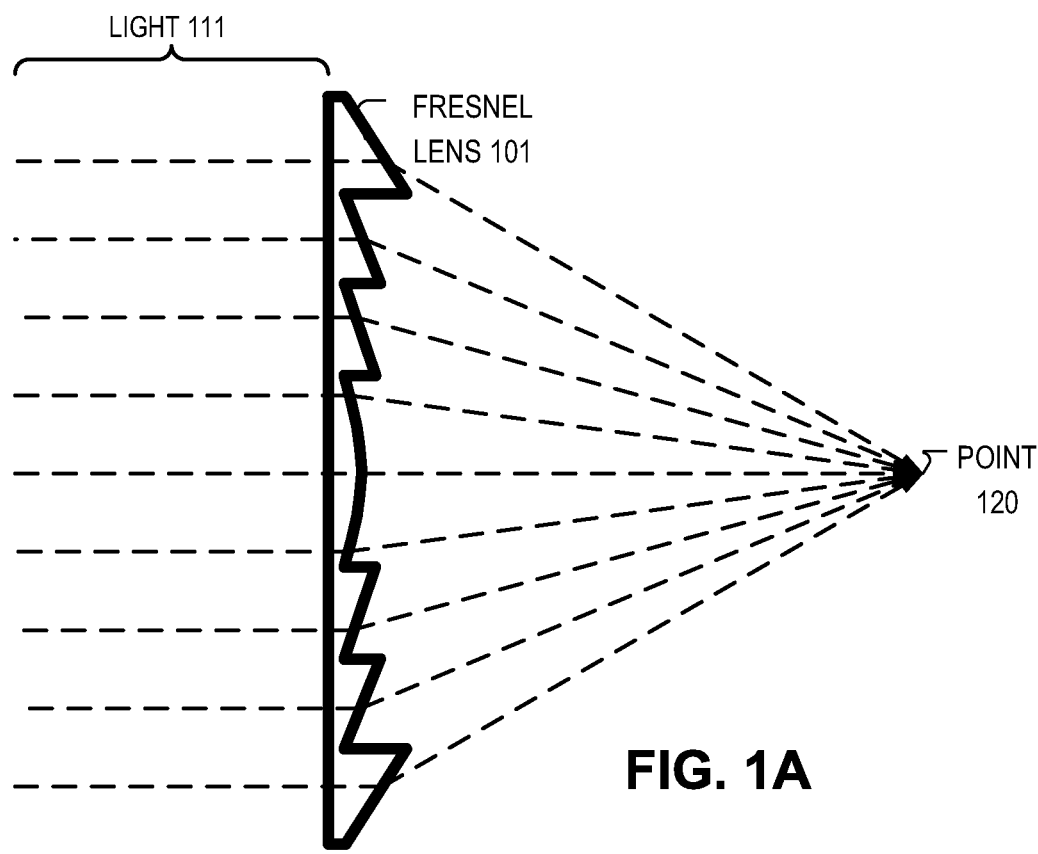
FIGS. 1A and 1B illustrate example Fresnel lenses receiving incoming light.
Figure 1B:
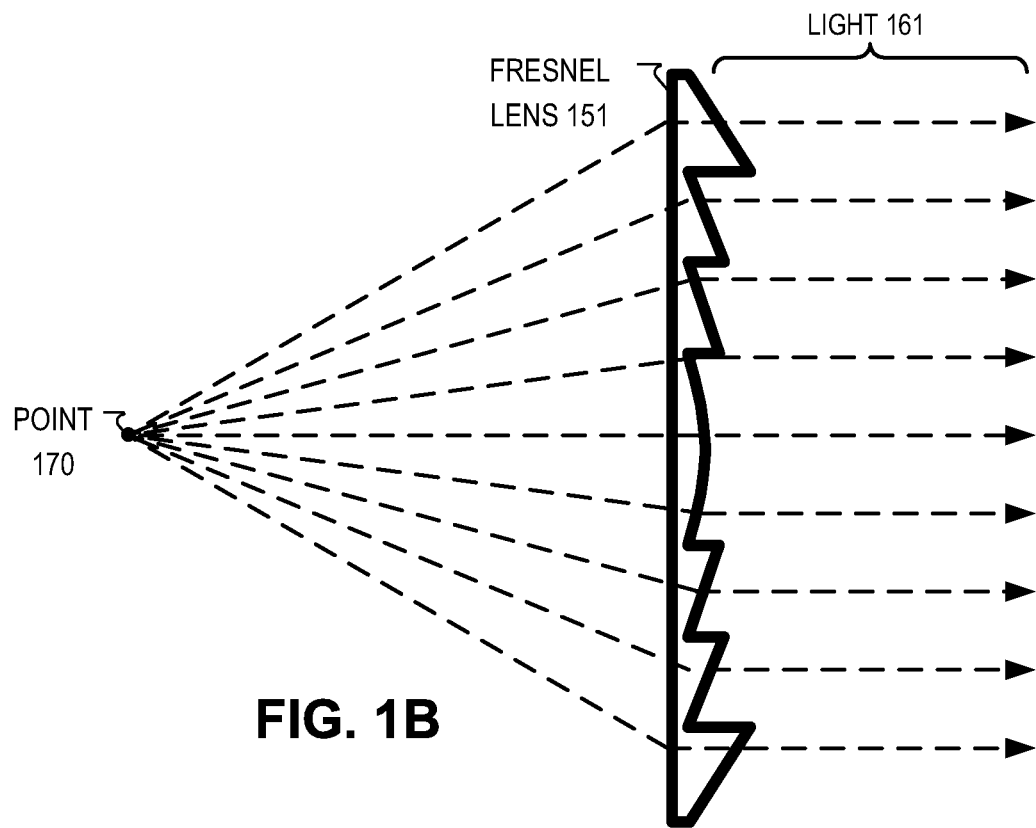

FIG. 1A illustrates a cross-section of an example Fresnel lens 101 receiving incoming light 111 and focusing the incoming light 111 to a focal point 120. The illustrated Fresnel lens 101 may be made from a refractive material such as glass or plastic. In FIG. 1A, Fresnel lens 101 has a positive optical power to focus incoming light 111 to focal point 120. In other implementations, Fresnel lenses may be used to collimate light such as example Fresnel lens 151 in FIG. 1B generating collimated light 161 from incoming light received from a point 170. Fresnel lens 151 may also be made from a refractive material such as glass or plastic.

Figure 2A:
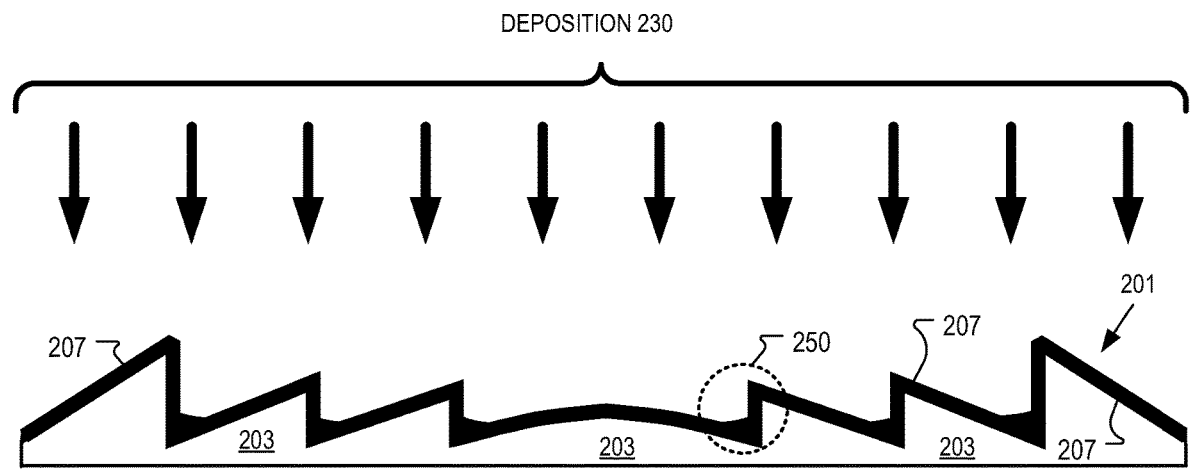
FIG. 2A illustrates an example optical layer deposited on an example Fresnel lens where excess of the optical layer is accumulated in valleys of Fresnel segments that are included in the Fresnel lens.

In certain contexts, it is desirable to add an optical layer such as an anti-reflective coating or a color filter to a Fresnel lens. FIG. 2A illustrates an example optical layer 207 deposited on an example Fresnel lens structure 201. In FIG. 2A, a deposition process 230 was used to deposit optical layer 207 on the Fresnel surface formed from refractive material 203. Deposition process 230 may include a vapor deposition process performed in a vacuum chamber, for example. In one embodiment, chemical vapor deposition (CVD) is used as the vapor deposition process. In one embodiment, physical vapor deposition (PVD) is used as the vapor deposition process. As shown in FIG. 2A, excess of the optical layer 207 has accumulated in valleys of the Fresnel surface formed by refractive material 203.

Figure 2B:
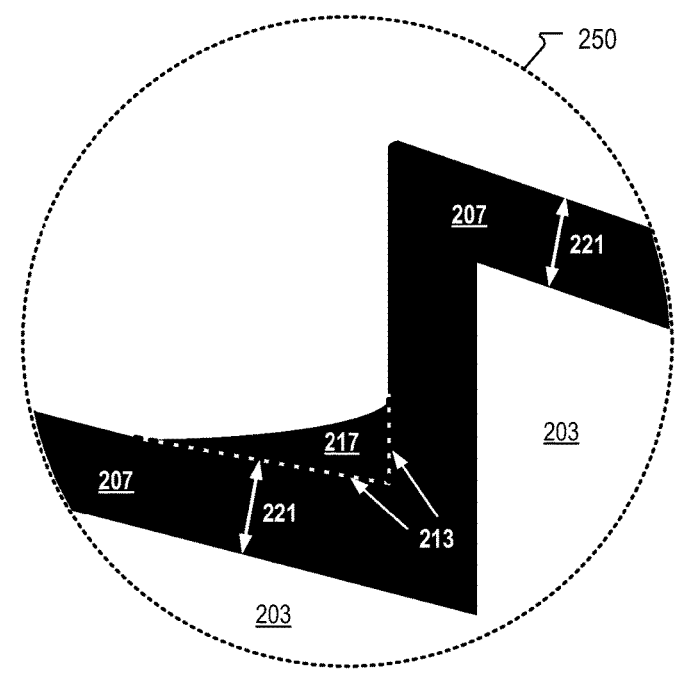
FIG. 2B illustrates a zoomed-in view of excess optical layer disposed in a valley of the Fresnel lens illustrated in FIG. 2A.

FIG. 2B illustrates a zoomed-in view 250 of excess 217 of optical layer 207 that is disposed in a valley of the Fresnel lens structure 201 illustrated in FIG. 2A. In FIG. 2B, optical layer 207 has a design thickness 221, yet the thickness of the optical layer 207 in the valley is greater than design thickness 221 dues to the excess 217 of optical layer 207. Hence, the intended refractive boundary 213 has been shifted and light that encounters excess 217 may be directed in an unintended direction. This shifting of the intended refractive boundary 213 may contribute to blurring or scattering in an optical system that includes Fresnel lens structure 201.

FIG. 3A illustrates a cross-section view of an example Fresnel lens 301 including example compensation trenches 333 disposed in valleys 331 of the Fresnel lens 301, in accordance with an embodiment of the disclosure. Fresnel lens 301 includes a Fresnel surface that includes a central lens 337 and Fresnel segments 335A, 335B, 335C, 335D, 335E, and 335F (collectively referred to as Fresnel segments 335). Fresnel segments 335 may also be referred to as "teeth" or individually as a "tooth" by those skilled in the art. Valleys 331A, 331B, 331C, 331D, 331E, and 331F (collectively referred to as valleys 331) are included in the illustrated Fresnel surface. A valley refers generally to the lower portion of a Fresnel feature (e.g. Fresnel segment 335 or central lens 337) where the Fresnel feature meets another Fresnel feature. In the illustrated embodiment, valley 331C is between Fresnel segment 335C and central lens 337 and valley 331D is between Fresnel segment 335D and central lens 337. Valley 331A is between Fresnel segments 335A and 335B and valley 331B is between Fresnel segment 335B and 335C. Similarly, valley 331E is between Fresnel segments 335D and 335E and valley 331F is between Fresnel segment 335E and 335F.

In the illustrated embodiment, Fresnel segment 335A is a mirror of the features of Fresnel segment 335F and may be referred to together as a "Fresnel pair" or "Fresnel group" since they impart the same optical power. Fresnel segments 335B and 335E may also be referred to as a "Fresnel pair" or "Fresnel group." Furthermore, Fresnel segments 335C and 335D may also be referred to as a "Fresnel pair" or "Fresnel group."

In FIG. 3A, the cross-section of Fresnel lens 301 has three Fresnel groups for explanation and illustration purposes, but of course, Fresnel lens 301 may have many more Fresnel groups than three. Furthermore, Fresnel lens 301 may have Fresnel segments 335 that include more rounded features that more closely follow segments of a spherical or aspherical refractive lens that the Fresnel lens was modeled to replicate. In some embodiments, the Fresnel segments 335 will include curvatures that are dynamically drafted. The cross-section views illustrated in FIGS. 3A and 3B may be of Fresnel lenses that are shaped as round discs and the cross-section view may be a view cut through the center of the round disc.

FIG. 3B illustrates an example Fresnel lens structure 302 having an optical layer 307 disposed in the compensation trenches 333 and on a Fresnel surface of the Fresnel lens 301, in accordance with an embodiment of the disclosure. Optical layer 307 may have been deposited onto Fresnel lens 301 by way of one or more deposition processes such as CVD or PVD to form Fresnel lens structure 302. In FIG. 3B, optical layer 307 is disposed on the Fresnel surface and in the compensation trenches 333.

Example refractive materials 303 included in the Fresnel lens structure 302 may include glass or plastics such as PMMA. Optical polymers such as Zeonex® E48R or K26R may be used as refractive material 303, in some embodiments. Optical layer 307 may include dielectrics such as silicon dioxide, tantalum pentoxide, beryllium oxide, calcium fluoride, and/or titanium dioxide. Other dielectrics may also be utilized in optical layer 307. In one embodiment, optical layer 307 includes magnesium fluoride. In one embodiment, optical layer 307 is a single layer of magnesium fluoride. Optical layer 307 may include sub-layers with different indexes of refraction where each sub-layer is deposited during separate depositions. Optical layer 307 may be designed to be a color filter. In color filters that include sub-layers having different indexes of refraction, the thickness of the sublayers may be adjusted to tune to the optical coating for different reflection or transmission properties. The thickness of the optical layer 307 may be between one micron and 100 microns in some embodiments, depending on the application.

In one embodiment, optical layer 307 is an anti-reflective (AR) coating. Optical layer 307 may have an index of refraction that is less than refractive material 303 so that optical layer functions as an AR coating. In one embodiment, an index of refraction of the optical layer 307 is approximately the square root of an index of refraction of the refractive material 303 so that optical layer 307 forms an anti-reflective coating. In one embodiment, optical layer 307 has an index of refraction of approximately 1.38 and the refractive material 303 has an index of refraction of approximately 1.5. In one embodiment, optical layer 307 has an index of refraction of approximately 1.48 and the refractive material 303 has an index of refraction that approaches 2.0.

In one embodiment, optical layer 307 may have a thickness of approximately one quarter of a wavelength of a targeted light band (the wavelength measured as the target light band propagates through the index of refraction of the optical layer 307). In one embodiment, a green light is the targeted light band and the optical layer 307 has a thickness of one quarter of the wavelength of the green light which also provides anti-reflective properties to incoming light having slightly increased wavelengths (e.g. red visible light) and slightly decreased wavelengths (e.g. blue visible light). Of course, AR coatings with thicknesses that target reducing reflections of ultraviolet (UV) light and infrared (IR) light may also be utilized.

In the illustrated example of FIG. 3B, Fresnel segment 335F has a steeper slope than Fresnel segment 335E which has a steeper slope than Fresnel segment 335D. Similarly, Fresnel segment 335A has a steeper slope than Fresnel segment 335B which has a steeper slope than Fresnel segment 335C. Hence, the slope of the Fresnel segments increases as the Fresnel segments are of farther distance from central lens 337, in FIG. 3B. Steeper slopes of Fresnel segments 335 may contribute to a greater amount of excess optical coating accumulating in the valleys 331 during a deposition of optical layer 307. For example, there may be more excess of the optical layer 307 in valley 331F than in valley 331E. To account for this, in some embodiments, the volume of the compensation trenches that are disposed farther from the central lens 337 are of greater volume than the compensation trenches that are closer to the central lens 337. Therefore, the compensation trenches of greater volume are configured to receive the greater volume of excess optical layer 307 that will accumulate in the valleys due to the steeper slopes of the Fresnel segments disposed farther from central lens 337.

Figure 4B:
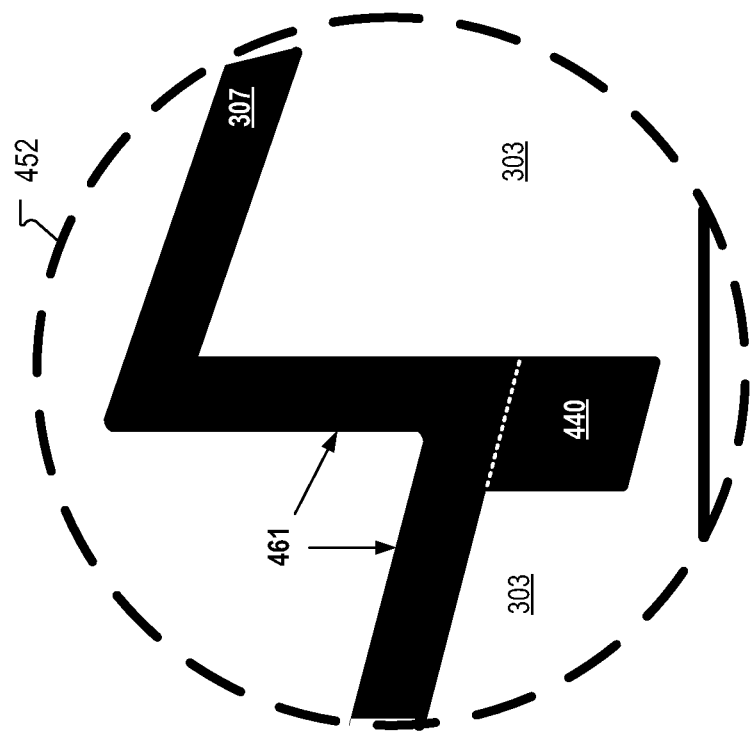
FIGS. 4A and 4B illustrate example compensation trenches filled with an optical layer, in accordance with an embodiment of the disclosure.
Figure 4A:
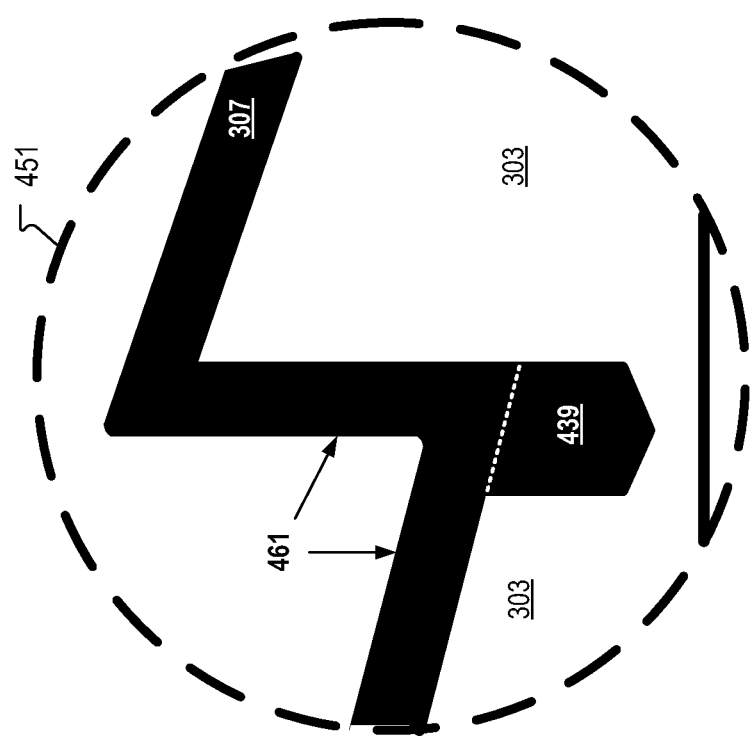

FIGS. 4A and 4B illustrate example compensation trenches filled with an optical layer 307, in accordance with an embodiment of the disclosure. Zoomed-in view 451 of FIG. 4A may be one example of view 351 of FIG. 3B. In FIG. 4A, example compensation trench 439 has received the excess from the optical layer 307 deposition to generate the intended boundary 461.

Zoomed-in view 452 of FIG. 4B may be one example of view 351 of FIG. 3B. FIG. 4B is similar to FIG. 4A except that example compensation trench 440 is shaped differently than compensation trench 439 while still achieving the same intended boundary 461.

Example compensation trench shapes 439 and 440 may be included in a mold that produces a Fresnel lens (e.g. 301) by injecting refractive material 303 into a mold that includes compensation features that define the compensation trenches. In one embodiment, compensation trench 439 is formed using a subtractive process. In one embodiment, compensation trench 439 is formed using a rotary drill bit (e.g. diamond cutting tool) to subtract material from a fabricated Fresnel lens.

In both FIGS. 4A and 4B, a thickness of the optical layer 307 disposed above the bottom of the compensation trenches is greater than a remaining thickness of the optical layer 307 that is not disposed above the compensation trench.

FIG. 4A and FIG. 4B are presented as examples of possible compensation trench shapes although other compensation trench shapes are possible. Depending on the shape of the Fresnel surface that receives the optical layer, designers may deposit an optical layer on a Fresnel surface that does not include compensation trenches and image the shape of the excess of the optical layer that forms in the valleys. Using images of the shape of the excess for a particular Fresnel surface, designers may then design compensation trenches with shapes and/or volumes configured to receive the excess of the optical layer 307 while still achieving the intended boundary 461. Although there may be a slight prescription change in incoming light that encounters the compensation trenches, the slight prescription change may be outweighed by the benefit of consolidating the excess optical layer to a narrow space (affecting a lesser percentage of incoming light) and achieving the intended boundary 461 that reduces blur caused by the boundary shape formed by the excess of the optical layer accumulating across a large portion of the valley 331.

Figure 5:
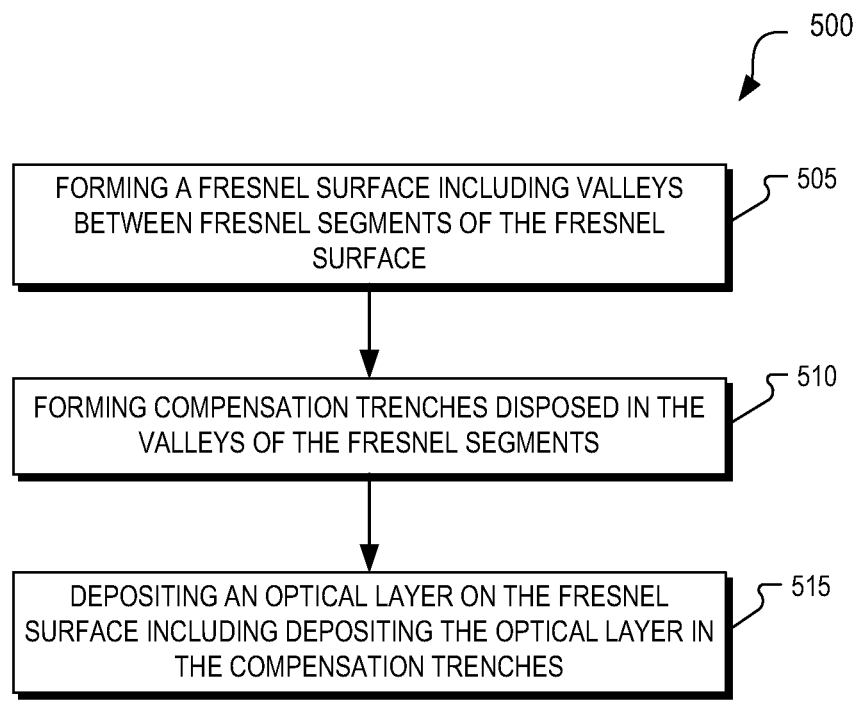
FIG. 5 illustrates a flow chart of an example process for fabricating a Fresnel optical element having compensation trenches, in accordance with an embodiment of the disclosure.

FIG. 5 illustrates a flow chart of example process 500 for fabricating a Fresnel optical element having compensation trenches, in accordance with an embodiment of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

In process block 505, a Fresnel surface is formed. The Fresnel surface includes valleys between Fresnel segments.

In process block 510, compensation trenches disposed in the valleys of the Fresnel segments are formed. In one embodiment, the Fresnel surface formed in process block 505 and the compensation trenches formed in process block 510 are formed contemporaneously in an injection molding process.

In process block 515, an optical layer is deposited on the Fresnel surface and depositing the optical layer on the Fresnel surface includes filling the compensation trenches with the optical layer. Depositing the optical layer on the Fresnel surface may include a vapor deposition of the optical layer. The optical layer may include an AR coating. In one embodiment, the optical layer includes a color filter. In one embodiment, the optical layer includes sub-layers and the sub-layers have differing indexes of refraction.

In one embodiment, a volume of the compensation trenches approximately offsets excess puddling of the optical layer that would form in the valleys if the compensation trenches were not present. In one embodiment, a depth of the compensation trenches is approximately equivalent to a thickness of the optical layer. The depth of the compensation trench is less than twice the thickness of the optical layer, in one embodiment.

In one embodiment, forming the Fresnel surface includes forming a Fresnel lens by injecting, into a mold, a refractive material with a first index of refraction and the optical layer has a second index of refraction that is different from the first index of refraction. The second index of refraction may be less than the first index of refraction. A mold may include compensation features for forming the compensation trenches.

In one embodiment, the compensation trenches described in this disclosure are utilized to make a Fresnel reflector that includes a Fresnel surface formed of a reflective material where compensation trenches are also formed in the reflective material to compensate for a deposit of an optical layer on the reflective material.

Figure 6:
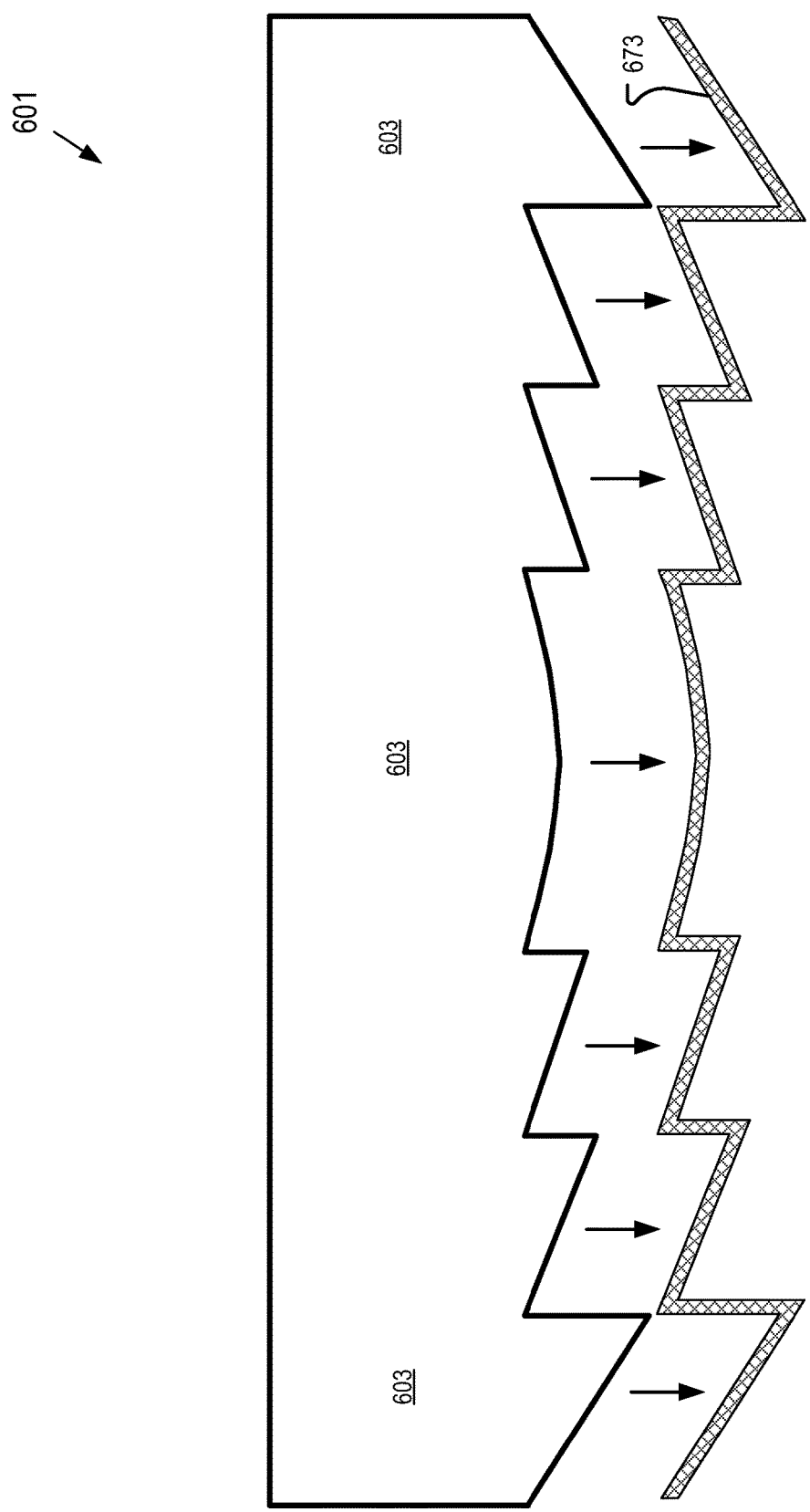
FIG. 6 illustrates a Fresnel lens for pairing with an example optical layer, in accordance with an embodiment of the disclosure.

FIG. 6 illustrates a Fresnel lens 601 formed of a refractive material 603 for pairing with an example optical layer 673, in accordance with an embodiment of the disclosure. The refractive material 603 may include the embodiments described in association with refractive material 303 and the optical layer 673 may include the embodiments described in association with optical layer 307.

In one embodiment, optical layer 673 is formed in a mold and Fresnel lens 601 is fabricated separately. Optical layer 673 may be a rigid part (having solidified in the mold) that is bonded to Fresnel lens 601. An index-matching bonding agent may be used to bond optical layer 673 to Fresnel lens 601. Using a mold to separately fabricate optical layer 673 allows for more precise definition of the optical layer 673 according to the mold and may avoid the issue of excess of the optical layer accumulating in valleys during a deposition process.

In one embodiment, a two-shot molding process is used to generate a Fresnel lens structure that includes optical layer 673 and Fresnel lens 601. A resin for forming optical layer 673 may be injected onto a portion of the mold that defines the desired Fresnel surface, but only enough resin will be injected into the mold to form a thin optical layer 673. A remaining cavity portion of the mold will remain empty to accept a second injection of material that forms refractive material 603. In some embodiments, the first shot of resin to form optical layer 673 may be given time to cool and/or harden so that the second injection of refractive material does not displace the optical layer 673 that has solidified along the Fresnel surface defining portion of the mold. Once the optical layer 673 has solidified, the second injection of refractive material 603 may be injected to form the resulting Fresnel lens structure. In one embodiment, the refractive material 603 injected into the mold is PMMA. In one embodiment, the optical layer 673 is injected into the mold as a polymer that includes a dye. In one embodiment, the dye is wavelength selective. In one embodiment, the dye transmits light in the visible spectrum while blocking infrared light.

Figure 7:
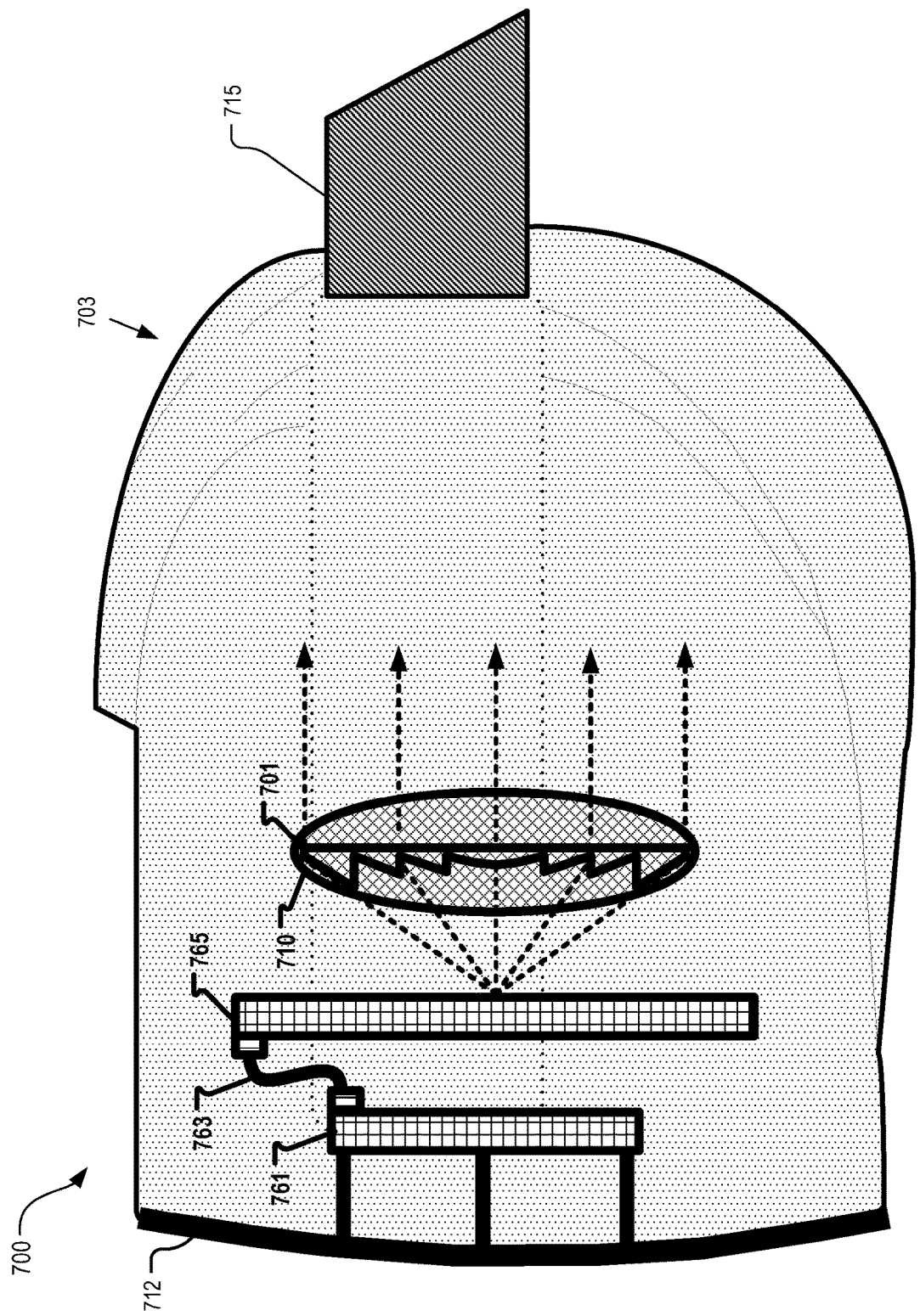
FIG. 7 illustrates an example head mounted display that includes a Fresnel optical element, in accordance with an embodiment of the disclosure.

FIG. 7 illustrates an example head mounted display (HMD) viewing structure 703 that includes a Fresnel optical element 701, in accordance with an embodiment of the disclosure. HMD viewing structure 703 also includes a mainboard 761 coupled to drive a display 765 via flex circuit 763. Lens assembly 710 is configured to create a virtual image viewed by an eye of a wearer of HMD viewing structure 703 by collimating image light generated from the display 765. In the illustrated embodiment, the Fresnel surface of Fresnel optical element 701 is on a display side of the Fresnel optical element 701, but in some embodiments, the Fresnel surface of the Fresnel optical element 701 may be on an eye side (opposite the display side) of the Fresnel optical element 701. The illustrated embodiment of HMD viewing structure 703 also includes a chassis 712 and a head strap 715 (only partially illustrated) to secure the HMD viewing structure 703 to a head of a wearer.

Mainboard 761 may include processors such as central processing units (CPUs) and/or graphics processing units (GPU). Flexible circuit board 763 is coupled to deliver image signals (such as video data) from the mainboard 761 to the display 765. Display 765 may be a liquid crystal display (LCD), organic light emitting diode (OLED) display, quantum dot display, micro-LED display, Liquid Crystal on Silicon (LCOS) display, or otherwise.

Fresnel optical element 701 may incorporate embodiments of the disclosure including refractive Fresnel lenses and/or Fresnel reflectors that include compensation trenches to accept excess of an optical layer that would accumulate in valleys of a Fresnel structure during a deposition of the optical layer. In one embodiment, the lens assembly 710 includes a Fresnel lens with an optical layer that includes an anti-reflective layer where the anti-reflective layer is disposed on an eye-side of a Fresnel lens that is opposite the display 765.

Although HMD viewing structure 703 is illustrated as conducive to Virtual Reality (VR) experiences, it is appreciated that the disclosed Fresnel optical elements may also be used to in Augmented Reality (AR) or Mixed Reality (MR) systems.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:
1. A Fresnel lens comprising:
a refractive material;
a Fresnel surface formed in the refractive material, wherein the Fresnel surface includes valleys between Fresnel segments of the Fresnel surface;
an optical layer disposed on the Fresnel surface; and
compensation trenches filled with the optical layer, the compensation trenches disposed in the valleys between the Fresnel segments, wherein a slope of each of the Fresnel segments increases as the Fresnel segments get farther from a distance from a central lens of the Fresnel lens, and wherein each of the compensation trenches is configured to increase in volume as the distance from the central lens increases to receive greater volumes of the optical layer that accumulates in the valleys of the Fresnel segments due to the slope of the Fresnel segments increasing as the distance from the central lens increases.

2. The Fresnel lens of claim 1, wherein the optical layer includes an anti-reflective (AR) layer, and wherein the refractive material has a first index of refraction and the optical layer includes at least one layer having a second index of refraction less than the first index of refraction.

3. The Fresnel lens of claim 1, wherein the optical layer includes a color filter, and wherein the optical layer includes sub-layers having differing indexes of refraction.

4. The Fresnel lens of claim 1, wherein a thickness of the optical layer is approximately one quarter of a wavelength of green light.

5. The Fresnel lens of claim 1, wherein a thickness of the optical layer disposed above a bottom of the compensation trenches is greater than a remaining thickness of the optical layer.

6. The Fresnel lens of claim 1, wherein the refractive material includes an optical polymer, and wherein the optical layer includes magnesium fluoride.

7. The Fresnel lens of claim 1, wherein a volume of the compensation trenches approximately offsets excess puddling of the optical layer that would form in the valleys without the compensation trenches.

8. The Fresnel lens of claim 1, wherein a bottom of each of the compensation trenches slopes down to a point in the middle of the bottom.

9. The Fresnel lens of claim 1, wherein a bottom of each of the compensation trenches slopes down toward an adjacent Fresnel segment.

10. A Head Mounted Display (HMD) comprising:
a display for providing image light; and
a lens assembly configured to receive the image light and create a virtual image for viewing by an eye of a wearer of the HMD, wherein the lens assembly includes a Fresnel lens comprising:
  a refractive material having a first index of refraction;
  a Fresnel surface formed in the refractive material, wherein the Fresnel surface includes valleys between Fresnel segments of the Fresnel surface;
  an optical layer disposed on the Fresnel surface, wherein the optical layer includes a second index of refraction different from the first index of refraction; and
  compensation trenches filled with the optical layer, the compensation trenches disposed in the valleys between the Fresnel segments, wherein a slope of each of the Fresnel segments increases as the Fresnel segments get farther from a distance from a central lens of the Fresnel lens, and wherein each of the compensation trenches is configured to increase in volume as the distance from the central lens increases to receive greater volumes of the optical layer that accumulates in the valleys of the Fresnel segments due to the slope of the Fresnel segments increasing as the distance from the central lens increases.

11. The HMD of claim 10, wherein the optical layer includes an anti-reflective (AR) layer.

12. The HMD of claim 10, wherein a bottom of each of the compensation trenches slopes down to a point in the middle of the bottom.

13. The HMD of claim 10, wherein a bottom of each of the compensation trenches slopes down toward an adjacent Fresnel segment.

14. A Fresnel lens comprising:
a refractive material;
a Fresnel surface formed in the refractive material, wherein the Fresnel surface includes valleys between Fresnel segments of the Fresnel surface;
an optical layer disposed on the Fresnel surface; and
compensation trenches filled with the optical layer, the compensation trenches disposed in the valleys between the Fresnel segments, wherein a volume of each of the compensation trenches increases as a slope of the Fresnel segment adjacent to the compensation trench increases.

* * * * *